United States Patent
Gruender et al.

(10) Patent No.: US 7,025,099 B1
(45) Date of Patent: Apr. 11, 2006

(54) DRIVE SYSTEM FOR VENEER SLICER

(75) Inventors: Hartmut Gruender, Bad Hersfeld (DE); Jürgen F. Trost, Canfield, OH (US); Daniel J. Rastatter, Beaver Falls, PA (US)

(73) Assignee: Danzer North America, Inc., Wilmington, DE (US)

( * ) Notice: Subject to any disclaimer, the term of this patent is extended or adjusted under 35 U.S.C. 154(b) by 0 days.

(21) Appl. No.: 09/763,240

(22) PCT Filed: Aug. 19, 1999

(86) PCT No.: PCT/US99/18794

§ 371 (c)(1),
(2), (4) Date: May 28, 2002

(87) PCT Pub. No.: WO00/10783

PCT Pub. Date: Mar. 2, 2000

Related U.S. Application Data (63) Continuation-in-part of application No. 09/328,081, filed on Jun. 8, 1999, now Pat. No. 6,102,090.

(60) Provisional application No. 60/097,305, filed on Aug. 20, 1998.

(51) Int. Cl.
*B27C 1/00* (2006.01)
*B27C 7/00* (2006.01)

(52) U.S. Cl. ................ 144/178; 144/162.1; 144/209.1; 144/214

(58) Field of Classification Search ............ 144/162.1, 144/178, 209.1, 211, 213, 214
See application file for complete search history.

(56) References Cited

U.S. PATENT DOCUMENTS

| | | | |
|---|---|---|---|
| 2,576,520 A | 11/1951 | Koss | |
| 2,676,627 A | 4/1954 | McFall | |
| 3,441,069 A | 4/1969 | Koss | |
| 3,654,973 A | 4/1972 | Koss | |
| 3,680,612 A | 8/1972 | Hale | |
| 3,750,725 A | 8/1973 | Cremona | |
| 4,063,578 A | 12/1977 | Cremona | |
| 4,068,693 A | 1/1978 | Cremona | |
| 4,069,850 A | 1/1978 | Cremona | |
| 4,083,391 A | 4/1978 | Cremona | |
| 4,089,354 A | 5/1978 | Cremona | |
| 4,102,372 A | 7/1978 | Cremona | |
| 4,137,957 A | 2/1979 | Cremona | |

(Continued)

FOREIGN PATENT DOCUMENTS

CA        1204985        5/1986

(Continued)

*Primary Examiner*—Derris H. Banks
(74) *Attorney, Agent, or Firm*—Barnes & Thornburg LLP (57) ABSTRACT

A drive mechanism for reciprocating a flitch table (114), the drive mechanism comprising a drive shaft (118) having an output end, a prime mover coupled to the drive shaft (118) for rotating the drive shaft (118), a coupler (120) on the output end of the drive shaft (118), and a connecting rod (122) coupled to the flitch table (114) and the coupler (120). The flitch table (114) is supported from the frame (130) by a guide member (128) secured to one of the flitch table (114) and the frame (130) and a bearing member (126) secured to the other of the flitch table (114) and the frame (130) for cooperation with the guide member (128). The guide member (128) and bearing member (126) form between them at least one channel (86) for a plurality of bearings (90). The bearings (90) are movable relative to the bearing member (126) and the guide member (128).

5 Claims, 9 Drawing Sheets

U.S. PATENT DOCUMENTS

| | | |
|---|---|---|
| 4,392,519 A | 7/1983 | Calvert |
| 4,503,740 A | 3/1985 | Brand et al. |
| 4,503,896 A | 3/1985 | Brand |
| 4,587,616 A | 5/1986 | Weil |
| 4,601,317 A | 7/1986 | Brand |
| 4,791,970 A | 12/1988 | Walser et al. |
| 4,831,747 A | 5/1989 | Roos et al. |
| 4,893,663 A | 1/1990 | Ely |
| 5,067,534 A | 11/1991 | Toivio |
| 5,101,874 A | 4/1992 | Weil |
| 5,143,129 A | 9/1992 | Toivio |
| 5,150,746 A * | 9/1992 | Weil .................. 144/215.3 |
| 5,381,841 A | 1/1995 | Weil |
| 5,383,504 A | 1/1995 | Cremona |
| 5,490,548 A | 2/1996 | Puranen |
| 5,511,598 A | 4/1996 | Brand |
| 5,562,137 A | 10/1996 | Brand |
| 5,590,700 A | 1/1997 | Brand |
| 5,680,887 A | 10/1997 | Brand |
| 5,868,187 A * | 2/1999 | Brand .................. 144/363 |
| 5,979,524 A | 11/1999 | Trost |
| 6,102,090 A | 8/2000 | Gruender et al. |

FOREIGN PATENT DOCUMENTS

| | | |
|---|---|---|
| DE | 25 23 482 | 5/1976 |
| DE | 39 28941 | 3/1990 |
| IT | N1084683 | 5/1977 |
| IT | N1126371 | 11/1979 |

* cited by examiner

DRIVE SYSTEM FOR VENEER SLICER

CROSS-REFERENCE TO RELATED APPLICATION

This application is a U.S. national counterpart application of international application Ser. No. PCT/US99/18794 filed Aug. 19, 1999, which claims pririty to U.S. Provisional application Ser. No. 60/097,305 Aug. 20, 1998, and claims priority to, and is a continuation-in-part application of, U.S. utility application Ser. No. 09/328,081 filed Jun. 8, 1999 (now U.S. Pat. No. 6,102,090 issued Aug. 15, 2000).

TECHNICAL FIELD

This invention relates to veneer slicers.

BACKGROUND ART

Various types of veneer slicers are known. There are, for example, the veneer slicers illustrated and described in the following U.S. Pat. Nos.: 2,576,520; 2,676,627; 3,441,069; 3,654,973; 3,680,612; 4,063,578; 4,068,693; 4,069,850; 4,083,391; 4,089,354; 4,102,372; 4,137,957; 4,503,896; 4,587,616; 4,601,317; 5,381,841; 5,511,598; 5,562,137; and, 5,590,700: Canadian Patent 1,204,985: and German Patent Specifications: 2,501,936; and, 2,523,481. There are also the disclosures of U.S. Pat. Nos.: 4,392,519; 4,503,740; 4,831,747; 4,893,663; 5,067,534; 5,101,874; 5,143,129; 5,383,504; and, 5,490,548: German Patent Specifications: 2,523,482; 3,915,516; and, 3,928,941: and, Italian Patent Specifications: 1,084,683; and, 1,126,371 The discloses of the cited references are incorporated herein for their teachings relating to the present invention. No representation is intended by this listing that an exhaustive search of all pertinent prior art has been made or that no better art than that listed exists, and no such representation should be inferred. This listing does not constitute a representation that the material listed is pertinent, and no such representation should be inferred.

DISCLOSURE OF THE INVENTION

According to one aspect of the invention, a veneer slicer comprises a frame and a flitch table for supporting a flitch for the slicing of veneer therefrom. The flitch table is supported from the frame. The veneer slicer further comprises a knife. The flitch table and knife are relatively movable along a path toward and away from one another. The flitch table is mounted on the frame for movement of the flitch across the knife in cutting and return strokes. The flitch table is supported from the frame by a guide member secured to one of the flitch table and the frame and a bearing member secured to the other of the flitch table and the frame for cooperation with the guide member. The guide members and bearing member form between them at least one channel for a plurality of bearings. The bearings are movable relative to the bearing member and the guide member.

Illustratively according to the invention, the guide member comprises a plurality of guide rails secured to one of the frame and flitch table. The bearing member comprises a plurality of bearing carriages secured to the other of the frame and flitch table for cooperation with each of the guide rails. Each bearing carriage and an associated guide rail form at least one of said channels.

Further illustratively according to the invention, the bearings are roller bearings.

Alternatively illustratively according to the invention, the bearings are ball bearings.

Illustratively according to the invention, at least one of the guide member and bearing member defines at least one circulating channel for the ball or roller bearings.

Additionally illustratively according to the invention, the stroke of the flitch table during which the knife assembly is in contact with the flitch to cut a slice of veneer from the flitch is an upward stroke.

Alternatively illustratively according to the invention, the stroke of the flitch table during which the knife assembly is in contact with the flitch to cut a slice of veneer from the flitch is a downward stroke.

According to another aspect of the invention, a drive mechanism for reciprocating a flitch table comprises a drive shaft having an output end, a prime mover coupled to the drive shaft for rotating the drive shaft, a coupler on the output end of the drive shaft, and a connecting rod coupled to the flitch table and the coupler.

Illustratively according to this aspect of the invention, the drive mechanism further includes a clutch.

Further illustratively according to this aspect of the invention, the clutch is operable selectively to cause rotation of the drive shaft and reciprocation of the flitch table.

Additionally illustratively according to this aspect of the invention, the coupler includes a connecting link. The drive mechanism further includes a counterweight coupled to the drive shaft to counterbalance the reciprocating/rotating mass of the flitch table, the connecting link and the connecting rod.

Alternatively illustratively according to this aspect of the invention, the coupler includes a flywheel. The flywheel includes counterweight to counterbalance 5 the reciprocating/rotating mass of the flitch table and connecting rod.

According to another aspect of the invention, a drive mechanism for coupling a flitch table to a prime mover consists essentially of a drive shaft, a throw, and a connecting rod. The drive shaft is coupled to the prime mover to be driven thereby to rotate. The throw is coupled to an output end of the drive shaft. The connecting rod couples the throw to the flitch table.

Illustratively according to this aspect of the invention, the drive shaft is coupled to the prime mover by a clutch. The clutch is actuable selectively to cause rotation of the drive shaft and reciprocation of the flitch table.

Further illustratively according to this aspect of the invention, a counterweight is coupled to the drive shaft to counterbalance the reciprocating/rotating mass of the flitch table, the throw and the connecting rod.

According to another aspect of the invention, a drive mechanism for coupling a flitch table to a prime mover consists essentially of a drive shaft, a flywheel, and a connecting rod. The drive shaft is coupled to the prime mover to be driven thereby to rotate. The flywheel is coupled to an output end of the drive shaft. The connecting rod couples the flywheel to the flitch table.

Illustratively according to this aspect of the invention, the flywheel includes counterweight to counterbalance the reciprocating/rotating mass of the flitch table and connecting rod.

BRIEF DESCRIPTION OF THE DRAWINGS

The invention may best be understood by referring to the following description and accompanying drawings which illustrate the invention. In the drawings.

MODES FOR CARRYING OUT THE INVENTION

A veneer slicer of the type described in certain of the above-identified patents, or in U.S. Ser. No. 09/096,308 filed Jun. 11, 1998, titled VENEER SLICER and U.S. Ser. No. 09/328,081 filed Jun. 8, 1999, titled FLITCH TABLE MOUNTING, both assigned to the same assignee as this application is provided for slicing veneer (not shown) from a flitch (not shown). The disclosures of U.S. Ser. Nos. 09/096,308 and 09/328,081 are incorporated herein by reference as a teaching of an illustrative veneer slicer mechanism. The flitch 11 is mounted upon the flitch table mounting system 12 for generally up-and-down reciprocating movement relative to a knife bar mounting system 13. The reciprocating movement of the flitch table mounting system 12, combined with stepwise movement of the knife bar mounting system 13 toward the flitch table mounting system 12 causes veneer to be cut from the flitch 11.

The flitch table mounting system 12 according to the present invention includes a flitch table 14 on the back side (side facing away from the knife bar mounting system 13) of which are mounted multiple linear bearings 16 best illustrated in FIGS. 1–2 and 6–7 of linear motion systems 15. The linear motion systems 15 additionally include guide rails 18 supported on an adapter frame 20, best illustrated in FIG. 2. Mounting all of the guide rails 18 on a common support such as frame 20 makes maintaining parallel relationships among the guide rails 18 more straightforward. The adapter frame 20 includes multiple vertical supports 22 which support the guide rails 18.

Figure 1:
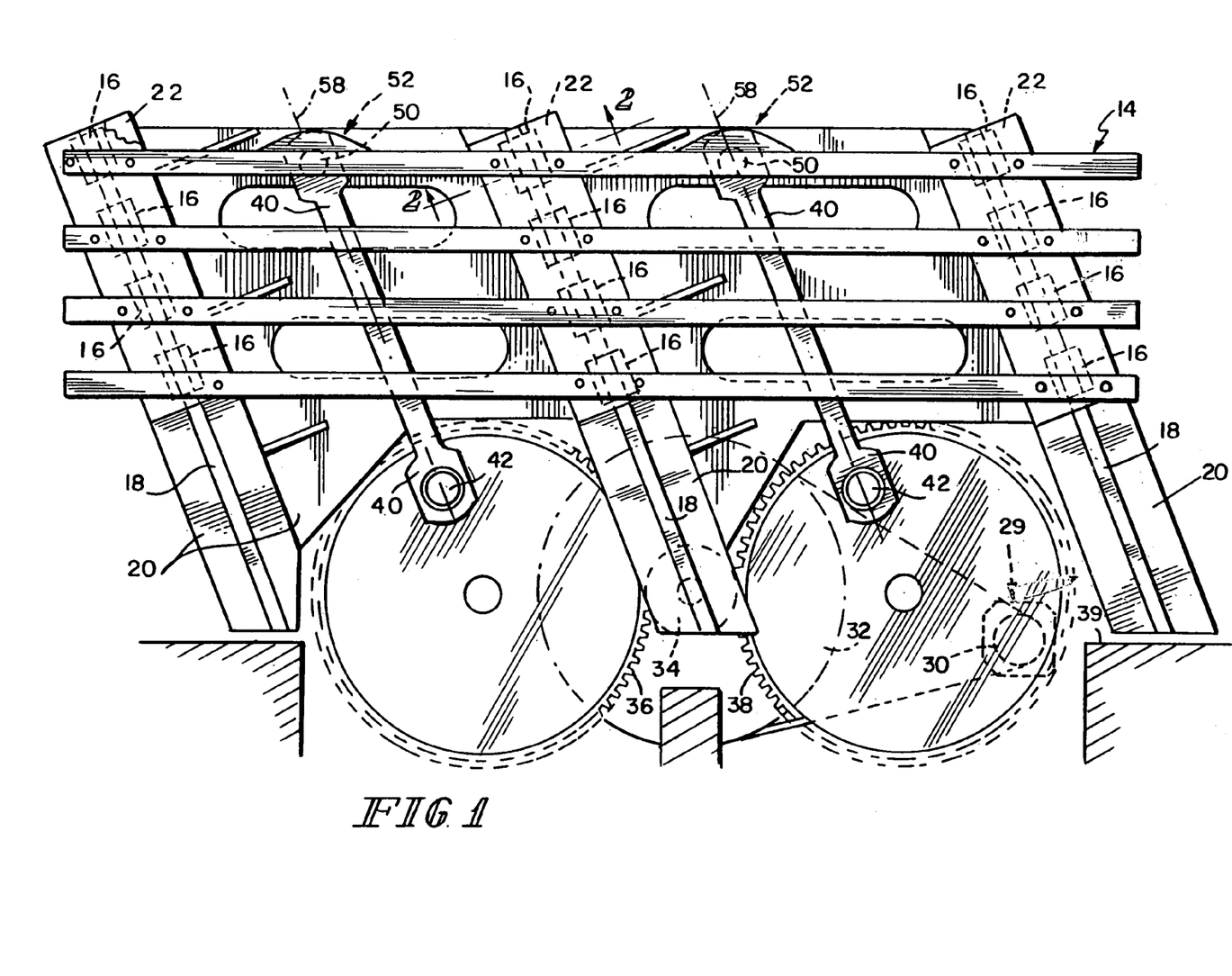
FIG. 1 illustrates a partially fragmentary, phantom front elevational view of a flitch table and reciprocating mechanism for a veneer slicer according to the invention.
Figure 2:
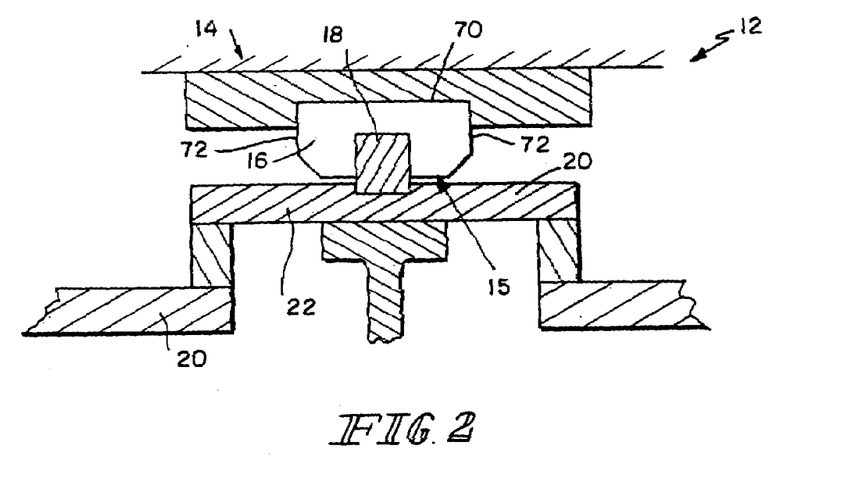
FIG. 2 illustrates a fragmentary sectional view of the flitch table and reciprocating mechanism illustrated in FIG. 1, taken generally along section lines 2—2 of FIG. 1.

Referring now to FIG. 1, a motor 29 works through a transmission including a drive pulley 30 and a driven pulley 32. A drive gear 34 is coupled to driven pulley 32. Drive gear 34 engages first and second driven gears 36, 38. The relative circumferences and/or numbers of teeth on the various pulleys and gears 30, 32, 34, 36, 38 reduce the rotation frequency from that of the motor 29 to the desired reciprocation frequency of table 12. For convenience, driven gears 36, 38 are positioned to lie partially above a floor level 39 and partially below the floor level 39.

First and second connecting rods 40 are pivotally coupled to driven gears 36, 38 at points 42. Wrist pins 50 pivotally couple the connecting rods 40 to the flitch table 14 at points 52 near the upper extent of the flitch table 14.

As the first and second driven gears 36, 38 are rotated, their rotation is converted to reciprocation of the flitch table 14 by the connections of the connecting rods 40 and wrist pins 50. The flitch table 14 is mounted for reciprocation by linear motion mechanisms 15. Each linear motion mechanism 15 includes linear bearings 16 mounted on respective ones of the three guide rails 18 in order to guide the flitch table 14 to reciprocate along a line of motion 58. In the embodiment illustrated in FIG. 1, there are three guide rails 18 and three or four linear bearings 16 are mounted on each guide rail 18. It is well within the scope of the invention to include a flitch table mounting system having any suitable number of linear bearings 16 mounted to any suitable number of guide rails 18.

With reference to FIGS. 6–9, in the illustrated embodiments each linear bearing 16 is formed to include a back wall 70 for mounting on the flitch table 14 and two sides 72. As best illustrated in FIGS. 4, 5, 6, and 8, the guide rails 18 are formed to include a top surface 80, a bottom surface 82, and two opposite side surfaces 84. Each side surface 84 is formed to include a groove or channel 86 therein, as illustrated in FIGS. 4, 5, 6, and 8. Sides 72 of linear bearings 16 are formed to be received within respective channels 86 formed in each side surface 84 of the guide rails 18. Illustratively, circulating roller bearings 90 are provided between the sides 72 of linear bearings 16 and the facing surfaces of each channel 86 of guide rails 18. The roller bearings 90 circulate in respective galleries 91 provided for circulation of the bearings 90 in linear bearings 16. Illustratively, linear bearings 16 may be Schneeberger Linear Technology type MRB 65 linear bearings. Of course, ball bearings or sliding bushings can be provided in place of roller bearings 90. If ball- or roller bearings are used in the linear motion systems 15, the bearings may be circulating, as illustrated, or non-circulating. Similarly, ball- or roller bearings, whether circulating or non-circulating, may be mounted on the rails 18 rather than on the linear bearings 16.

Figure 3:
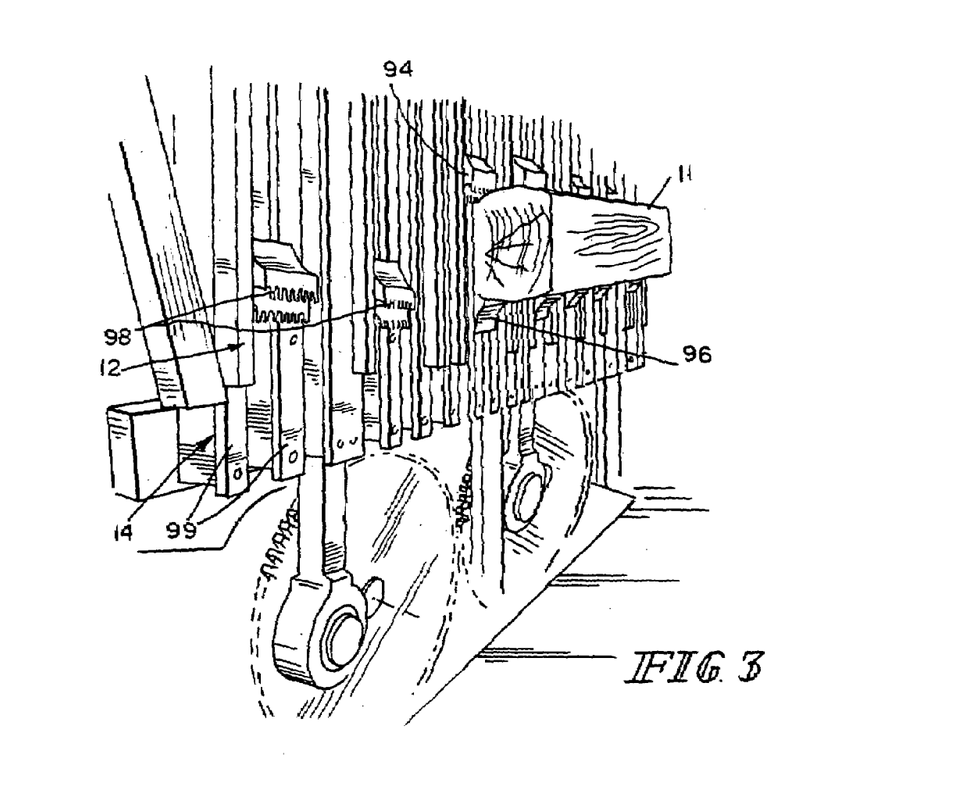
FIG. 3 illustrates a front perspective view of a portion of the flitch table and reciprocating mechanism with a flitch mounted to the flitch table by upper and lower dogs positioned to grip the flitch.
Figure 4:
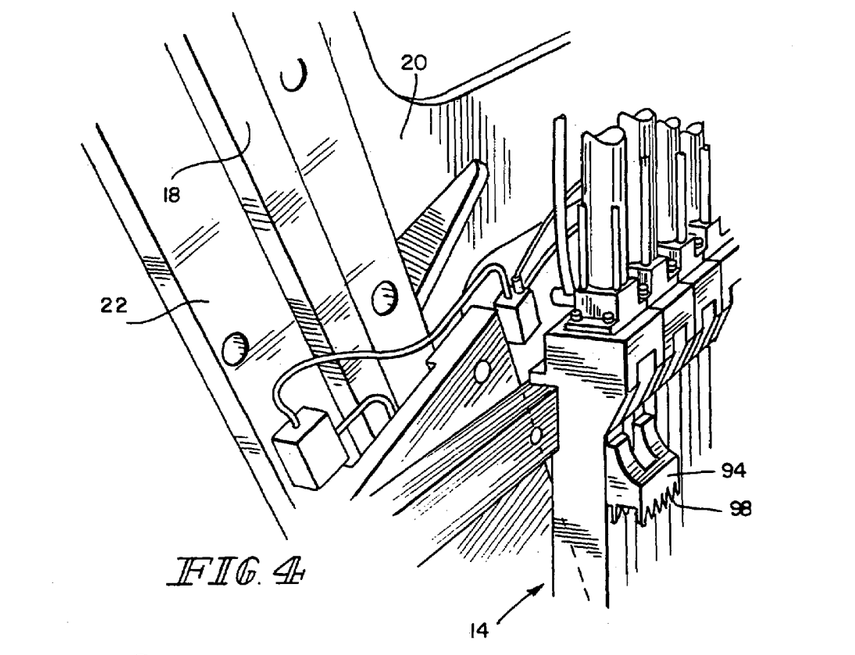
FIG. 4 illustrates a perspective view of a detail of the system illustrated in FIGS. 1–3.
Figure 5:
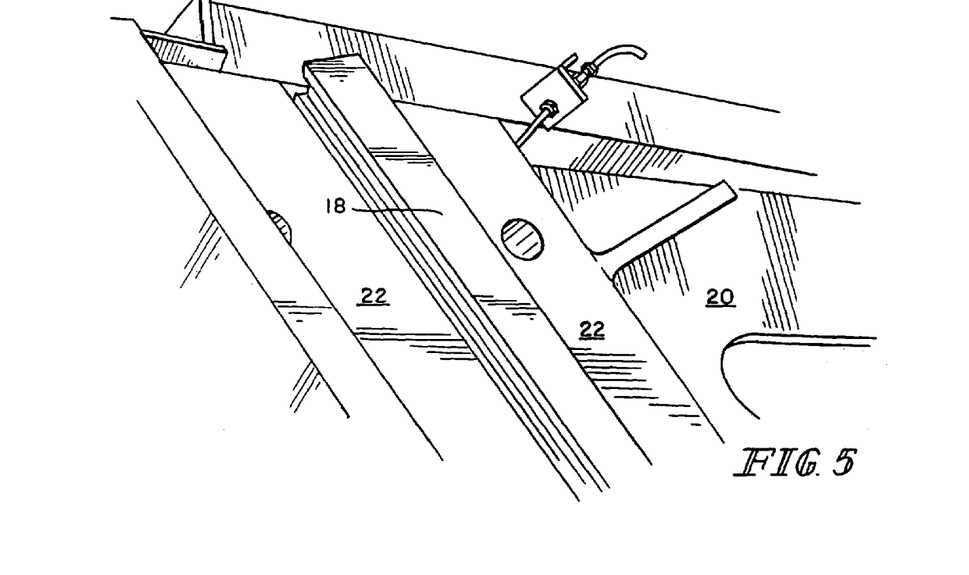
FIG. 5 illustrates another perspective view of a detail of the system illustrated in FIGS. 1–3.
Figure 6:
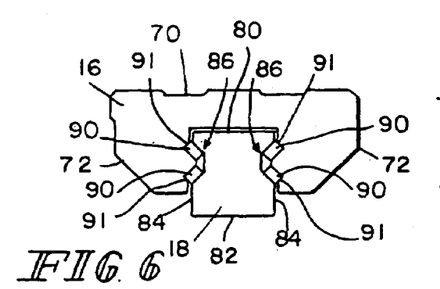
FIG. 6 illustrates a plan view of a detail of the system illustrated in FIGS. 1–3.
Figure 7:
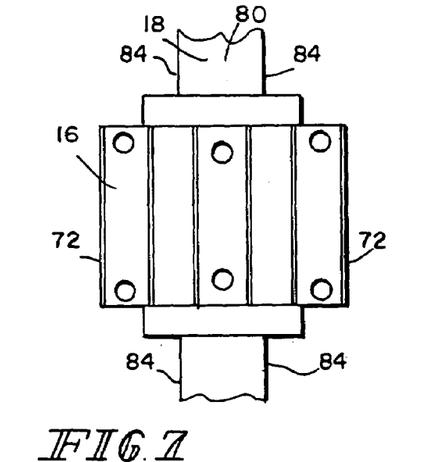
FIG. 7 illustrates an elevational view of a detail of the system illustrated in FIGS. 1–3
Figure 8:
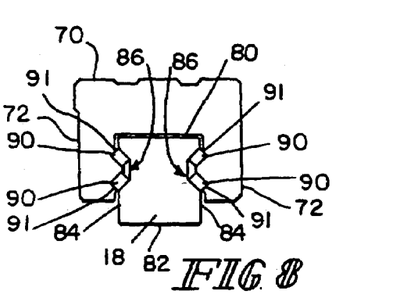
FIG. 8 illustrates a plan view of an alternative detail to the detail illustrated in FIGS. 6–7.
Figure 9:
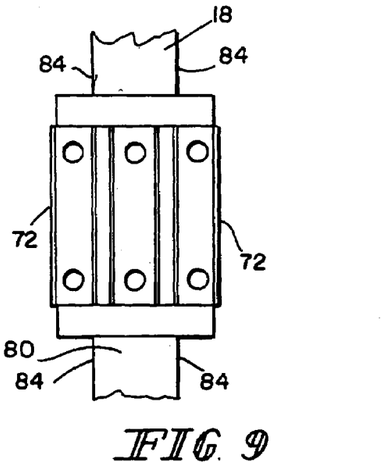
FIG. 9 illustrates an elevational view of the detail illustrated in FIG. 8.

Referring now to FIG. 3, the flitch is illustrated mounted upon the flitch table 14. The flitch 11 is supported by upper and lower dogs 94, 96, respectively. Both the upper and lower dogs 94, 96 are formed to include teeth 98 for gripping the flitch 11. The upper and lower dogs 94, 96 are hydraulically movable along rails 99 in order to grip the flitch 11 securely as the flitch table 14 and flitch 11 are reciprocated past a knife 100 mounted on the knife bar mounting system 13 in order to slice veneer from the flitch 11. Other dogging mechanisms, such as one of the general type illustrated and described in, for example, U.S. Pat. No. 5,150,746, or of any other suitable configuration, may be used instead of, or in combination with, those illustrated in the drawings.

Another embodiment illustrated in FIGS. 10–16 includes a flitch table mounting system 112 which is driven by a single crank, rather than by the first and second driven gears 36, 38 of the flitch table mounting system 12. The rotation of the single crank is converted to reciprocation of the flitch table 114 by the connection of one connecting rod and wrist pin. The flitch table 114 is mounted for reciprocation from any suitable number of linear motion systems 115, for example, linear motion systems 115 including linear bearings of the general configuration of linear bearings 16, or any other suitable configuration, from any suitable number of guide rails having the general configuration of guide rails 18, or any other suitable configuration.

Figure 10:
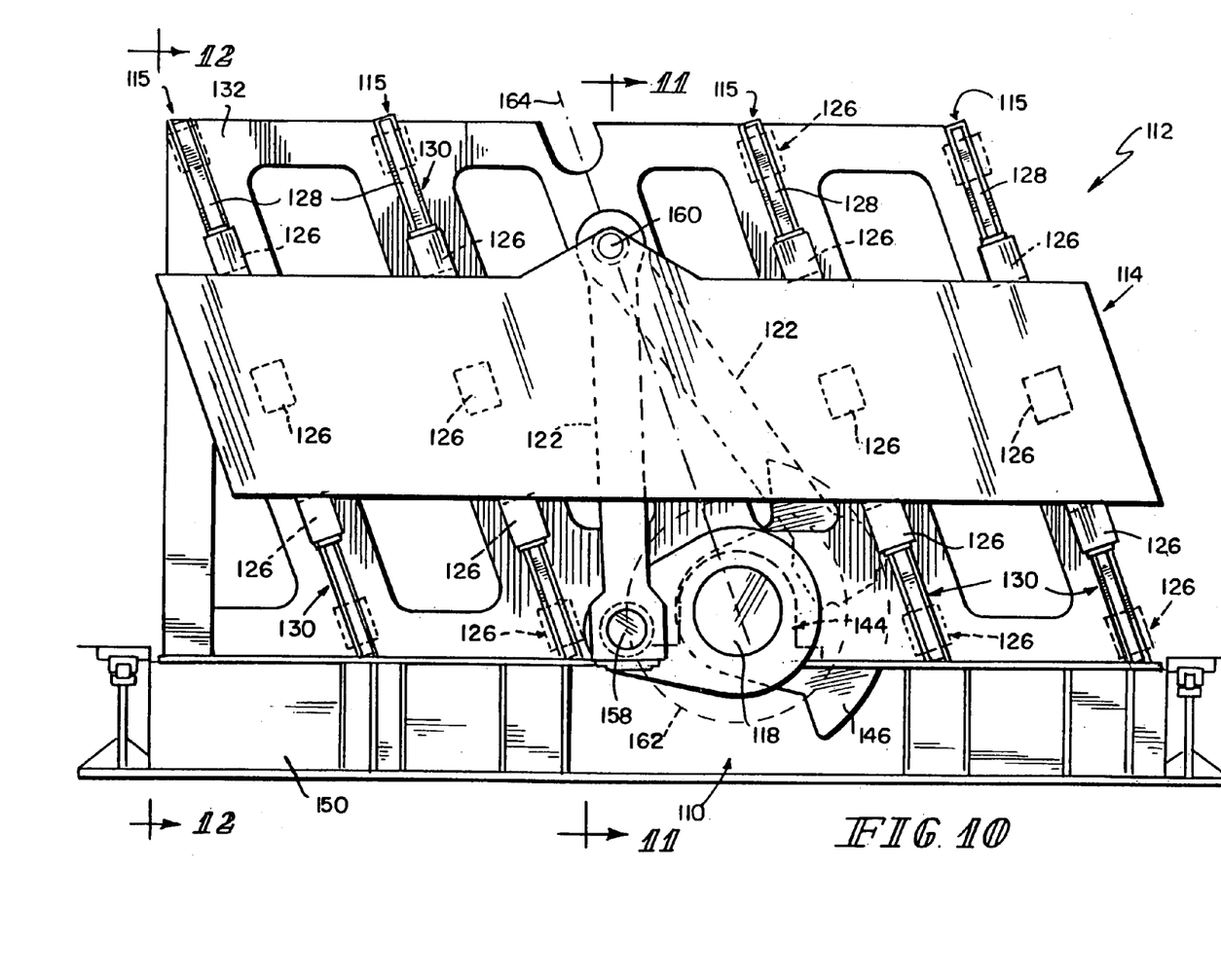
FIG. 10 illustrates a partially fragmentary, phantom front elevational view of another flitch table and reciprocating mechanism for a veneer slicer according to the invention.
Figure 11:
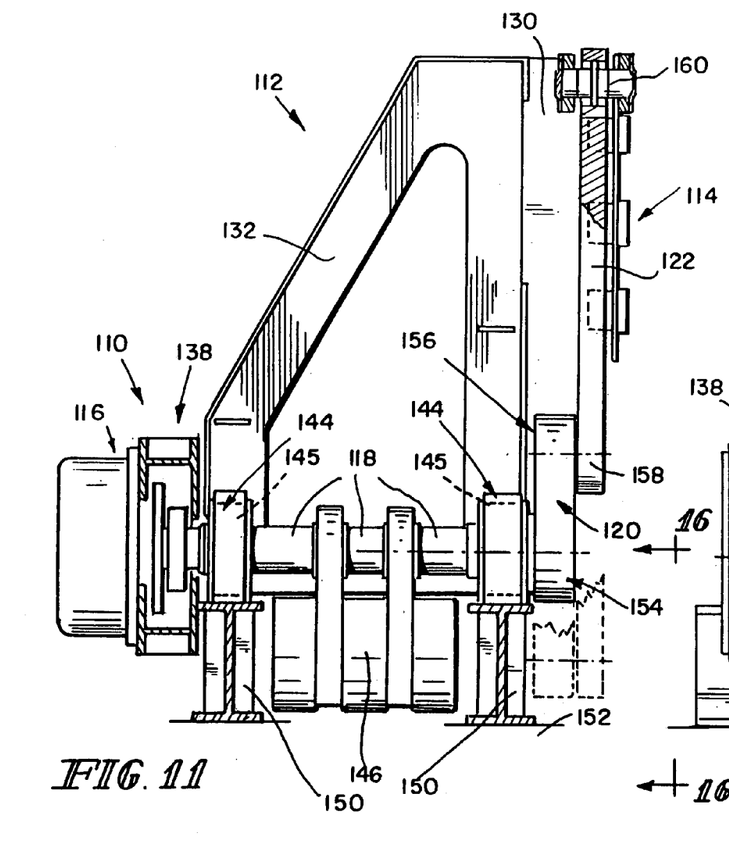
FIG. 11 illustrates a sectional view of the flitch table and reciprocating mechanism illustrated in FIG. 10, taken generally along section lines 11—11 of FIG. 10.

The flitch table mounting system 112 illustrated in FIGS. 10–17 includes a drive mechanism 110, a crank arm, crank throw or connecting link 120 coupled to the drive mechanism 110, a connecting rod or arm 122, illustrated in FIG. 10 in two of its positions, attached to the connecting link 120, and the flitch table 114 which is coupled to the connecting arm 122. The drive mechanism 110 includes a prime mover or main drive motor 200 (see FIG. 17), a planetary gearbox 116, and a main drive shaft 118 connected to the planetary gearbox 116. The connecting link 120 is coupled to a forward, or output, end of the main drive shaft 118. The connecting arm 122 is coupled to the connecting link 120 by a pin 123 and roller bearings 125. The flitch table 114 is coupled to the connecting arm 122 by a pin 127 and roller bearings 129.

The flitch table mounting system 112 additionally includes linear motion systems 115 permitting the linear movement of the flitch table 114. The linear motion systems 115 include multiple linear bearings 126 mounted to a back side of the flitch table 114. The linear motion systems 115 include guide rails 128 supported on multiple vertical supports 130. The vertical supports 130 and guide rails 128 are both supported by a frame 132 which helps maintain parallel relationships among the guide rails 128.

A planetary gearbox 116 is mounted to a base and is coupled between the prime mover and the main drive shaft 118. The drive train for the main drive shaft also includes a clutch and brake assembly 138. Engagement of the clutch of assembly 138 causes the main drive shaft 118 to be driven by the prime mover. Disengagement of the clutch of assembly and engagement of the brake causes the main drive shaft to stop rotating. Bearing housings 144 lie along the main drive shaft 118. The bearing housings 144 house roller bearings 145 to facilitate rotation of the main drive shaft 118. Each bearing housing 144 is mounted on, for example, a welded I-beam base 150 supported on a floor 152. A counterweight 146 is positioned along the main drive shaft 118. The counterweight 146 balances the reciprocating/rotating mass of the flitch table 114, connecting link 120 and connecting arm 122.

Figure 17:
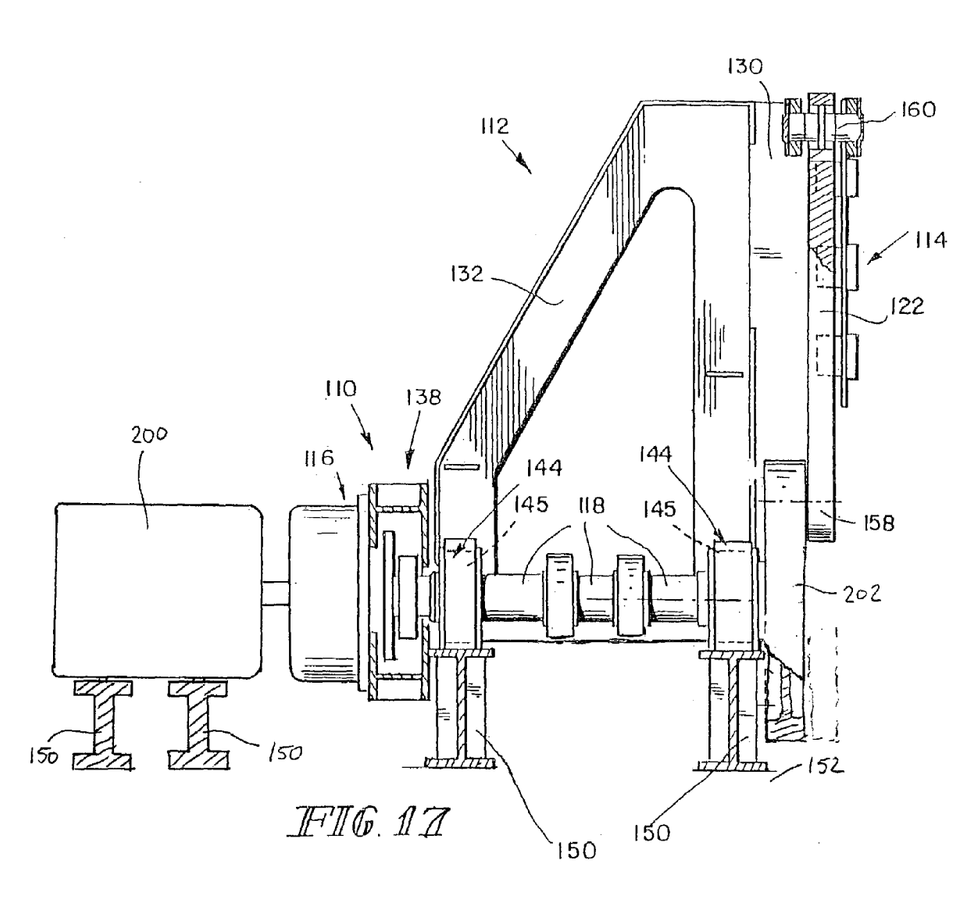

The connecting link 120 is coupled to the opposite end of the drive shaft 118 from the planetary gear box 116. A first end 154 of the connecting link 120 is coupled to the drive shaft 118. A second end 156 of the connecting link 120 is coupled to the connecting arm 122 at a pivot point 158. Connecting arm 122 is pivotally coupled to the flitch table 114 as illustrated at 160. While the connecting link 120 is illustrated as an arm or rod, it should be understood that, for example, a flywheel 202 could be substituted for the connecting link 120 or for both the connecting link 120 and counterweight 146 in accordance with known principles and as shown in FIG. 17. In FIG. 17, the counterweight 146 and connecting link 120 are omitted and the connecting arm 122 is coupled to the flywheel 202 at pivot point 158.

Figure 12:
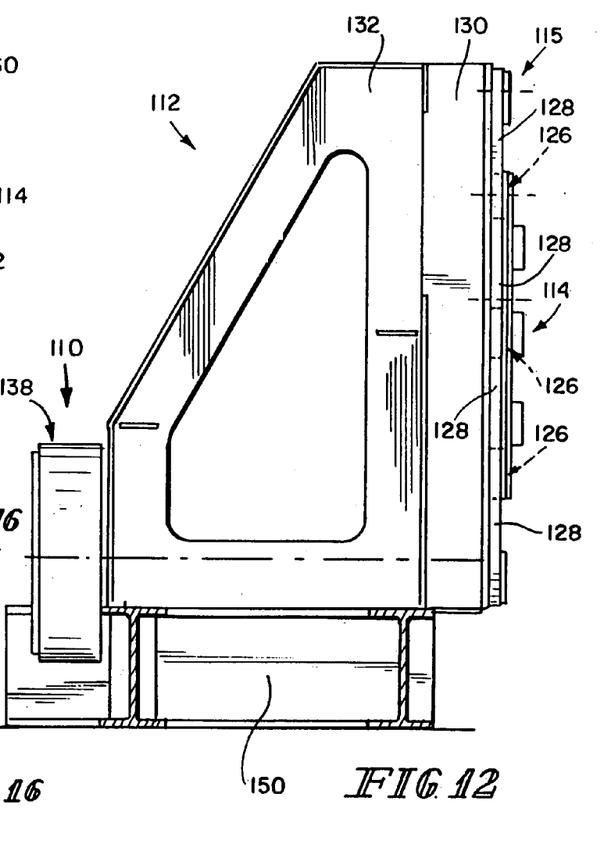
FIG. 12 illustrates an end elevational view of the flitch table and reciprocating mechanism illustrated in FIG. 10, taken generally along section lines 12—12 of FIG. 10.
Figure 13:
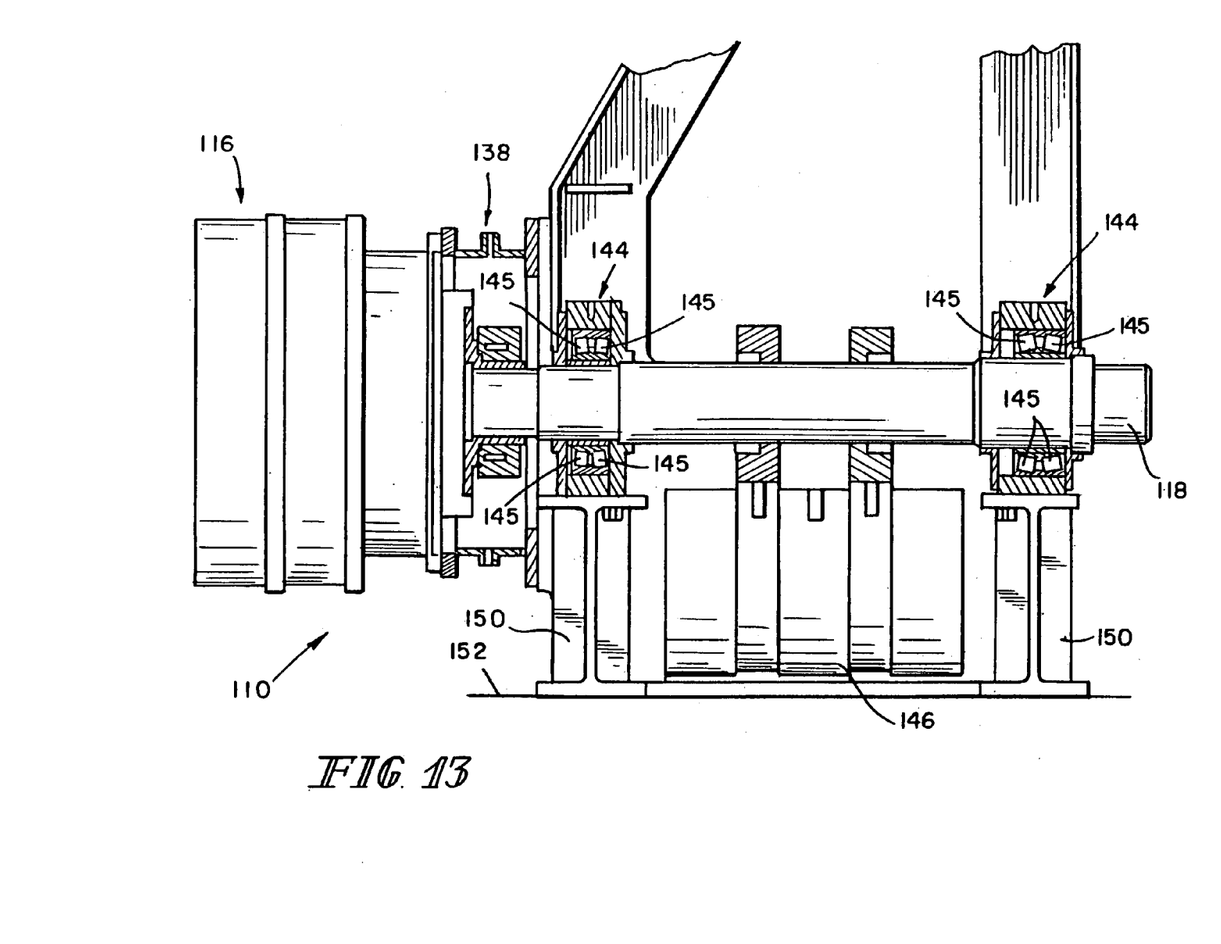
FIG. 13 illustrates an enlarged view of a detail of the flitch table and reciprocating mechanism illustrated in FIGS. 10 and 11.
Figure 14:
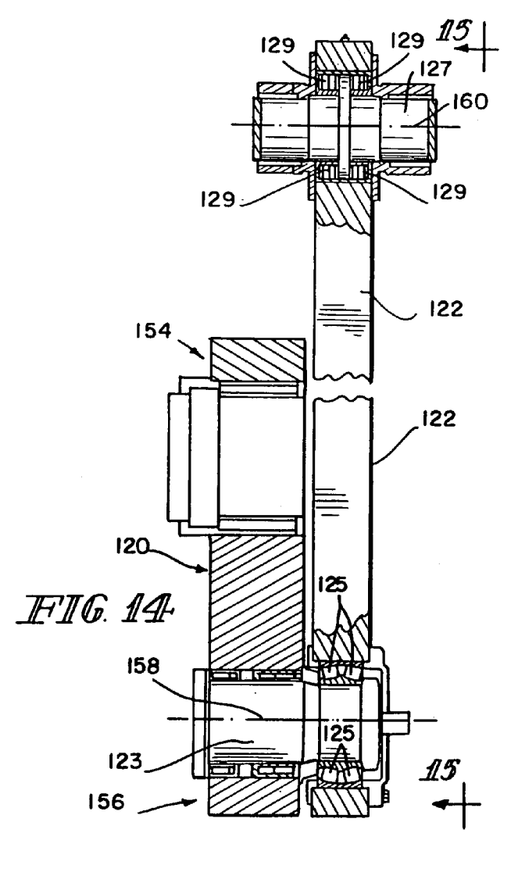
FIG. 14 illustrates an enlarged, partly fragmentary, partly vertically sectional side elevational view of a detail of the flitch table and reciprocating mechanism illustrated in FIGS. 10–12.
Figures 15, 16:
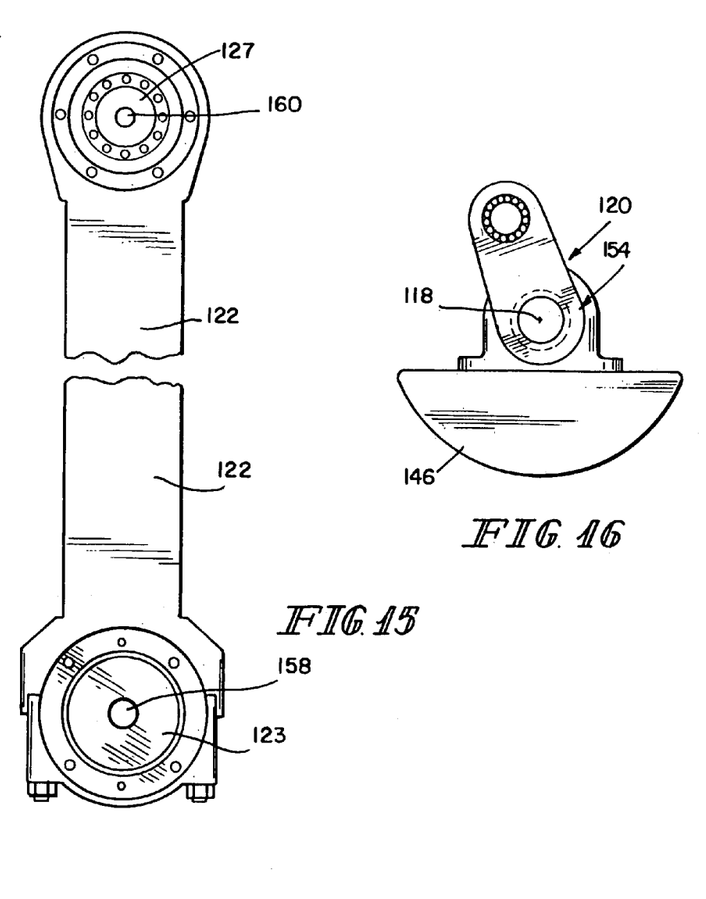
FIG. 15 illustrates a fragmentary front elevational view of the detail illustrated in FIG. 14, taken generally along section lines 15—15 thereof.
FIG. 16 illustrates a fragmentary front elevational view of a detail illustrated in FIG. 11, taken generally along section lines 16—16 thereof; and, FIG. 17 illustrates a sectional view of a another embodiment of a flitch table and reciprocating mechanism showing a prime mover and a flywheel.

Thus, as the main drive shaft 118 is rotated, the connecting link 120 revolves so that pivot point 158 follows a circular path around the axis of main drive shaft 118, as illustrated by broken line 162. This motion is converted into reciprocation of the flitch table 114 by the connecting arm 122. The flitch table 114 is mounted for reciprocation by linear motion systems 115 in order to guide the flitch table 114 to reciprocate along a line of motion 164. In the embodiment illustrated in FIGS. 10–16, four guide rails 128 are provided with three linear bearings 126 mounted on each guide rail 128. The remaining two linear bearing positions 126 illustrated in, for example, FIGS. 10 and 12, are the positions occupied by the upper and lower linear bearings 126 at the uppermost and lowermost positions of the flitch table 114. It is well within the scope of the invention to include a flitch table mounting system having any suitable number of linear bearings 126 mounted to any suitable number of guide rails 128.

The invention claimed is:

1. A drive mechanism for coupling a flitch table to a prime mover, the drive mechanism consisting essentially of a drive shaft, a throw, and a connecting rod, the drive shaft coupled to the prime mover to be driven thereby to rotate, the throw being coupled to an output end of the drive shaft, and the connecting rod coupling the throw to the flitch table.

2. The drive mechanism of claim 1 wherein the drive shaft is coupled to the prime mover by a clutch, the clutch actuable selectively to cause rotation of the drive shaft and reciprocation of the flitch table.

3. The drive mechanism of claim 1 further including a counterweight coupled to the drive shaft to counterbalance the moving mass of the flitch table, the throw and the connecting rod.

4. A drive mechanism for coupling a flitch table to a prime mover, the drive mechanism consisting essentially of a drive shaft, a flywheel, and a connecting rod, the drive shaft coupled to the prime mover to be driven thereby to rotate, the flywheel being coupled to an output end of the drive shaft, and the connecting rod coupling the flywheel to the flitch table.

5. The drive mechanism of claim 4 wherein the flywheel includes counterweight to counterbalance the moving mass of the flitch table and connecting rod.

* * * * *